United States Patent [19]  [11] Patent Number: 4,626,567
Chang  [45] Date of Patent: Dec. 2, 1986

[54] WATER-RESISTANT CLEAR AND COLORED ACRYLIC LATEX SEALANT

[75] Inventor: Wei T. Chang, Dayton, Ohio

[73] Assignee: Beecham Home Improvement Products Inc., Dayton, Ohio

[21] Appl. No.: 791,330

[22] Filed: Oct. 25, 1985

[51] Int. Cl.$^4$ .................. C08K 3/34; C08K 5/24; C08K 9/06
[52] U.S. Cl. .................. 524/493; 523/213; 524/188; 524/555
[58] Field of Search .................. 523/213; 524/493, 188

[56] References Cited

U.S. PATENT DOCUMENTS

| | | | |
|---|---|---|---|
| 3,561,996 | 2/1971 | Young | 427/407.1 |
| 3,772,237 | 11/1973 | Bullman | 524/188 |
| 3,940,360 | 2/1976 | Carder | 524/188 |
| 4,151,154 | 4/1979 | Berger | 523/213 |
| 4,277,387 | 7/1981 | Jordan et al. | 524/296 |
| 4,340,524 | 7/1982 | Bullman | 524/503 |

FOREIGN PATENT DOCUMENTS 0078443  5/1982  Japan .................. 524/188

*Primary Examiner*—Herbert J. Lilling
*Attorney, Agent, or Firm*—Jacobs & Jacobs

[57] ABSTRACT

An acrylic copolymer latex sealant composition, which comprises an acrylic copolymer having a glass transition temperature not exceeding about −0° C., a hydrolyzed organoaminosilane, an anionic, non-ionic or amphoteric surfactant, water, and at least about 0.5% by weight silica, based on the total amount of the composition.

21 Claims, No Drawings

WATER-RESISTANT CLEAR AND COLORED ACRYLIC LATEX SEALANT

The present invention relates to acrylic copolymer latex sealants.

Acrylic copolymer latex sealants are widely used, except in applications requiring wet adhesion and/or water resistance. As disclosed in Bullman, U.S. Pat. No. 4,340,524, intermittent wetting of acrylic latex based sealants after they have cured is not a problem. However, if the acrylic latex based sealants are immersed in water for continuous periods of time, that is, 24 hours or longer, total loss of adhesion can occur. Furthermore, these sealants under such conditions begin to soften and lose integrity due to the lack of water resistance. Acrylic latex sealants which have only cured for several hours exhibit greater sensitivity to water and lose dimensional stability.

Bullman proposes to improve the water resistance of acrylic resin latex based sealants by introducing a hydrophobic resin dissolved in a liquid organic non-coagulating, non-gelling solvent into an acrylic latex resin which has been previously treated with an aqueous solution of a hydrolyzed organoaminosilane and a base. Typical hydrophobic resins disclosed by Bullman are vinyl resins, polystyrene, acrylic resins and the like.

While Bullman's acrylic latex sealant is disclosed as having improved wet adhesion and water resistance, nevertheless it has not been commercially produced. In particular, this acrylic latex sealant does not appear to have the required package stability for a commercial product, as well as other shortcomings.

The present invention provides an acrylic latex cement meeting the package stability and performance requirements of a commercial sealant. In particular, the acrylic latex sealant of the present invention can be commercially marketed as a water-resistant acrylic latex sealant for use on a variety of substrates in conformance with Federal Specification TT-S-00230C, Type II, Class A and Class B. It is believed that this is the first commercial Class A acrylic latex sealant. Furthermore, the acrylic latex sealant of the invention also meets the requirements ASTM C-920-79, Type S, Grade NS, Class 12½ and Class 25.

Accordingly, the present invention now provides an acrylic copolymer latex sealant composition, which comprises an acrylic copolymer having a glass transition temperature not exceeding about $-0°$ C. an organoaminosilane, silica, an anionic, amphoteric or non-ionic surfactant and water. If desired, the latex sealant may optionally further comprise a filler, a pigment or colorant, a plasticizer and other additives customarily used in sealants.

In accordance with the present invention, the acrylic copolymer may suitably be a copolymer of an alkyl acrylate or methacrylate copolymerized with an ethylenically unsaturated comonomer. Generally, the alkyl acrylate or methacrylate will be the predominant component of the copolymer, with the comonomer being present in minor amounts. As is known, one or more alkyl acrylates or methacrylates may be used to form the copolymer. Useful comonomers include acrylic acid, methacrylic acid, itaconic acid or N-methylol acrylamide or a mixture of two or more thereof and the like. Copolymers of monomers, such as acrylonitrile, that impart an undesired yellowing to the sealant are not useful in a clear sealant but may be useful in a colored sealant. Preferably, the alkyl acrylate or methacrylate will comprise from about 1 to about 8 carbon atoms in the alkyl moiety, such as ethylacrylate, hexyl acrylate and the like. In any case, the copolymer must have a glass transition temperature not exceeding about $-0°$ C. such as from about $-10°$ C. to about $-30°$ C., in order to cooperate with the other materials in the sealant in meeting the desired performance requirements.

The acrylic copolymer is preferably present in an amount of from about 20 to about 65% by weight on a dry basis, based on the weight of the total composition, preferably from about 35 to about 60% by weight. Usually, the acrylic copolymer will be employed in the form of a latex having a solids content of from about 40 to about 60%, by weight, based on the weight of the latex.

Organoaminosilanes disclosed in the Bullman patent are also useful in the present invention, such as those having the formula

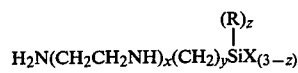

wherein
R is alkyl, aryl or alkaryl;
X is alkoxy of 1 to 8 carbon atoms;
x is 0, 1 or 2,
y is 1 to 6; and
z is 0, 1 or 2.

In the above formula, R may suitably be alkyl of 1 to 6 carbon atoms, such as methyl, ethyl, butyl, hexyl and the like, phenyl, naphthyl, tolyl, benzyl and the like. Preferably, however, z is zero and the silane has three alkoxy groups, preferably of 1 to 6 carbon atoms. It is further preferred that y is 3. Thus, it is presently preferred to use gamma-aminopropyltrimethoxysilane, N-(beta-aminoethyl)-gamma-aminopropyltrimethoxysilane or N'-(beta-aminoethyl)-N-(beta-aminoethyl)-gamma-aminopropyltrimethoxysilane or the like. Other organoaminosilanes include aminomethyltriethoxysilane, gamma-aminopropylmethyldiethoxysilane, gamma-aminopropyldiethoxysilane, gamma-aminopropylphenyldiethoxysilane. N-beta(aminoethyl)-gamma-aminopropyltriethoxysilane, delta-aminobutylmethyldiethoxysilane, delta-aminobutylethyldiethoxysilane, delta-aminobutylphenyldiethoxysilane and the like.

The organoaminosilane can be used as such, in which case it will hydrolyze in situ, or it may be hydrolyzed before it is compounded with the other materials used to form the acrylic latex sealant of the invention, as disclosed in the Bullmann patent. The amount of organoaminosilane used in this invention can range from about 0.1 to about 5 weight % of the total composition on a dry basis, with about 0.3 to about 1 weight % being preferred.

The silica cooperates with the organoaminosilane to provide adhesive properties for the sealant that are needed to satisfy the desired performance requirements. Unless both the organoaminosilane and the silica are used, one or more of the desired performance requirements will be lacking. In addition, the silica aids in providing the sealant with the desired thixotropy and rheological properties.

The silica used in this invention may be a hydrophillic fumed silica or it may be a hydrophobic fumed silica derivative in which some of the hydroxyl groups on the surface of the fumed silica have been replaced by trimethylsiloxyl groups. Such hydrophobic silicas are known as silica silylates and are commercially available. It is presently preferred to use a hydrophillic silica.

Silica having a particle size of up to about 50 millimicrons or more may be used in this invention, preferably from about 5 to about 30 millimicrons. In general, there does not appear to be any advantage in using an amount of silica larger than necessary to obtain the improvements in adhesion and theology discussed above, and indeed the use of too large an amount may unduly thicken the sealant and adversely affect its gunnability and the like. Conversely, the use of very small amounts of silica, such as below about 0.5%, will not be sufficient to provide the required adhesive strength for the sealant. Accordingly, it is presently contemplated that the amount of silica will be at least about 0.5%, such as from about 0.5 to about 5%, preferably from about 0.85 to about 3.5%, and most preferably from about 1.5 to about 3%, based on the total weight of the sealant composition.

A base is used to provide the sealant with a pH of at least about 8 so as to avoid corrosion of the containers for the sealant that would occur at a pH below 7. In addition, the latex sealant is thickened and has improved viscosity characteristics at a pH of about 8 to about 10. Usually, from about 0.01 to about 2% by weight, based on the total composition of the base will be sufficient. Alkali metal or alkaline earth metal hydroxides, amines, alkanolamines, ammonia, quaternary ammonium hydroxides and the like may be used as the base. Ammonium hydroxide is presently preferred.

An important aspect of the present invention is the provision of a clear latex sealant that meets the package stability and performance requirements required of a commercial sealant. The clear sealants of the present invention are storage stable and non-yellowing and satisfy the demanding performance requirements of Federal Specification TT-S-00230C., Type II. However, where colored sealants are desired, colorants or pigments, such as iron oxide, titanium dioxide, chromium oxide, etc. and pigment dispersants may be used.

An anionic, non-ionic or amphoteric surfactant is also present, preferably a non-ionic surfactant, to stabilize the latex emulsion and to improve the mechanical stability of the composition. The surfactant may be used in an amount of from about 0.1 to about 5% by weight, based on the total weight of the composition.

Suitable non-ionic surfactants include polyethylene oxide condensates of alkylphenols, polyoxyalkylene derivatives of propylene glycol, condensates of ethylene oxide and the reaction product of propylene oxide and ethylene diamine, ethylene oxide condensates of aliphatic alcohols, long chain tertiary amine oxides, long chain tertiary phosphine oxides, long chain dialkyl sulfoxides and the like. Useful anionic surfactants include those obtained by alkylating aromatic nuclei, sulfonating the resulting alkylated aromatic hydrocarbons and neutralizing the sulfonation products. Alkyl benzene sulfonates, such as dodecylbenzenesulfonate are typical of this class. Fatty alcohol sulfates are also useful as surface active agents.

Fillers may be optionally employed in the present invention, such as any conventional inorganic filler, e.g. carbonates, oxides and sulphates. Suitable fillers include calcium carbonate, calcium oxide, magnesium carbonate, barium sulfate and the like. When present, the filler may be about 10 to about 30% by weight, based on the total weight of the composition.

The sealant of the present invention may also include, if desired, plasticizers, free-thaw stabilizers, colorants or pigments, pigment dispersants, anti-bacterial and/or anti-fungal preservatives, and agents for improving rheological properties such as thickeners and anti-slump agents. The plasticizer will generally be used in an amount of up to about 25% by weight and the other additives, when present, will total up to about 3% by weight, based on the total weight of the composition. A plasticizer may be desirable to reduce the tack of the copolymer so that the sealant can have the desired tack-free time of less than 72 hours. As is known, the tack of the copolymer can also be reduced by crosslinking the copolymer.

The sealant composition of the present invention may be readily prepared using a conventional mixer, followed by deairing. Mixing and deairing procedures are well known in the art.

The present invention is illustrated in terms of its presently preferred embodiments in the following Examples. In this specification and the appended claims, all parts, proportions and percentages are by weight, unless otherwise stated.

EXAMPLE 1

Acrylic copolymer latex sealant was prepared from the following ingredients using the procedure described below:

| MATERIAL | PERCENT |
| --- | --- |
| Acrylic Latex[1] | 78.7 |
| Silane[2] | 0.8 |
| Ammonium Hydroxide (28%) | 0.7 |
| Fumed Silica, 8 mμ particle size | 2.2 |
| Non-ionic surfactant[3] | 1.7 |
| Plasticizer[4] | 11.2 |
| Other[5] | 4.7 |
| | 100.0 |

[1] Acrylic copolymer latex (58% solids) containing 96% of a copolymer of ethylacrylate and ethylhexylacrylate, 2% acrylic acid, and 2%-N—methylol acrylamide. Tg = −27° C.
[2] Gamma-aminopropyltriethoxy silane.
[3] Octylphenoxy-polyethoxyethanol.
[4] Mineral Oil.
[5] Freeze-thaw stabilizer; water; biocide; and defoamer.

The sealant composition was prepared by charging the acrylic copolymer latex to a mixer and, while mixing, adding the surfactant, freeze-thaw agent, defoamer and anti-bacterial agent, followed by sequential addition of the ammonium hydroxide, plasticizer, silica, organoaminosilane and water. As is known, each ingredient is well mixed in the batch before the next is added. The final step was to deair the batch, after which a clear sealant composition was obtained. The pH of the composition was greater than 8. A clear acrylic latex sealant was obtained.

EXAMPLE 2

Following the procedure described in Example 1, a white sealant composition was obtained by adding titanium dioxide. Other colors are obtained by using an appropriate colorant, e.g. to provide dark bronze, aluminum gray, limestone and brown sealants.

EXAMPLE 3

An acrylic copolymer latex sealant essentially identical to Example 1 was tested for conformance to Federal Specification TT-S-00230C, Sealing Compound: Elastomeric Type, Single Component (For Caulking, Sealing and Glazing in Buildings and Other Structures), Type II, Class A and Class B.

The sealant was tested in accordance with the procedures outlined in the specification. The curing conditions used were 7 days at 77° F. and 50% RH, followed by 14 days at 122° F. The aluminum and glass substrates were solvent cleaned with methyl ethyl ketone, rinsed with distilled water and air dried. The mortar substrates were wire brushed, wiped with a damp cloth and air dried. The mortar substrates were tested both primed and unprimed. Ethafoam was used as the back-up material.

The sealant conformed to the requirements of Federal Specification TT-S-00230C, Type II, Class A and Class B, when tested on aluminum, glass and primed mortar, with the exception of weight loss.

The sealant also passed tests for package stability, including adhesion and gunnability after accelerated aging and freeze-thaw cycles, and was found to be commercially acceptable. So far, as is known, no prior art latex sealant passed the Class A performance requirements of Federal Specification, TT-S-00230C, Type II.

The clear acrylic latex sealant of Example 1 was also tested for conformance to ASTM C-920-79, Standard Specification For Elastomeric Joint Sealants, Type S, Grade NS, Class 12½ and Class 25.

The sealant was tested in accordance with the procedures outlined in the specification. The curing conditions used were 7 days at 77° F. and 50% RH, followed by 14 days at 122° F. The aluminum and glass substrates were solvent cleaned with methyl ethyl ketone, rinsed with distilled water and air dried. The mortar substrates were wire brushed, wiped with a damp cloth and air dried. The mortar substrates were tested both primed and unprimed. Ethafoam was used as the back-up material.

The sealant conformed to the requirements of ASTM C-920-79, Grade NS, Class 12½ and Class 25, when tested on glass, aluminum and primed mortar, with the exception of weight loss.

I claim:

1. An acrylic copolymer latex sealant composition, which comprises an acrylic copolymer having a glass transition temperature not exceeding about 0° C., an organoaminosilane, at least about 0.5% silica, based on the total weight of the composition, an anionic, non-ionic or amphoteric surfactant, and water.

2. The composition according to claim 1, wherein said silica is a hydrophillic fumed silica.

3. The composition according to claim 2, wherein said acrylic copolymer has a glass transition temperature of about −10° to about −30° C.

4. The composition according to claim 1, wherein said acrylic copolymer is a copolymer of an alkyl acrylate or methacrylate copolymerized with an ethylenically unsaturated comonomer.

5. The composition according to claim 4, wherein said comonomer comprises acrylic acid, methacrylic acid, itaconic acid or N-methylol acrylamide or a mixture of two or more thereof.

6. The composition according to claim 5, wherein said alkyl acrylate or methacrylate has from about 1 to about 8 carbon atoms in the alkyl moiety.

7. The composition according to claim 1, wherein said organoaminosilane is of the formula:

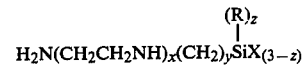

wherein
R is alkyl, aryl or alkaryl;
X is alkoxy of 1 to 8 carbon atoms;
x is 0, 1 or 2;
y is 1 to 6; and
z is 0, 1 or 2.

8. The composition according to claim 7, wherein z is 0, y is 3 and X is alkoxy of 1 to 6 carbon atoms.

9. The composition according to claim 8, wherein said organoaminosilane is gamma-aminopropyltrimethoxysilane, N-(beta-aminoethyl)-gamma-aminopropyltrimethoxysilane or N'-(beta-aminoethyl)-N-(beta-aminoethyl)-gamma-aminopropyltrimethoxysilane.

10. The composition according to claim 1, which includes a non-ionic surfactant.

11. The composition according to claim 1, comprising from about 20 to about 65% of said acrylic copolymer, from about 0.1 to about 5% of said organoaminosilane, and from about 0.5 to about 5% of said silica, all by weight based on the weight of the total composition.

12. The composition according to claim 11, wherein said silica has a particle size of up to about 50 millimicrons.

13. The composition according to claim 12, which includes a non-ionic surfactant.

14. The composition according to claim 13, herein said non-ionic surfactant is present in an amount of from about 0.1 to about 5% by weight, based on the weight of the total composition.

15. The composition according to claim 14, wherein said acrylic copolymer is a copolymer of an alkyl acrylate or methacrylate copolymerized with an ethylenically unsaturated comonomer.

16. The composition according to claim 15, wherein said comonomer comprises acrylic acid, methacrylic acid, itaconic acid or N-methylol acrylamide or a mixture of two or more thereof.

17. The composition according to claim 16, wherein said silica is a hydrophillic fumed silica.

18. The composition according to claim 17, wherein the amount of said silica is from about 0.85 to about 3.5%.

19. The composition according to claim 18, wherein said silica has a particle size of from about 5 to about 30 millimicrons.

20. The composition according to claim 1, which is clear.

21. The composition according to claim 1, which is colored.

* * * * *